United States Patent

Harner

[15] 3,706,930

[45] Dec. 19, 1972

[54] REDUNDANT, RADIO TRANSMITTER AND RECEIVER CONTROL SYSTEMS FOR TELEMETERING SYSEMS

[72] Inventor: Robert H. Harner, Park Ridge, Ill.

[73] Assignee: S & C Electric Company, Chicago, Ill.

[22] Filed: Nov. 27, 1970

[21] Appl. No.: 93,488

Related U.S. Application Data

[63] Continuation of Ser. No. 777,402, Nov. 20, 1968, abandoned.

[52] U.S. Cl. ....................................325/56, 325/158

[51] Int. Cl. ................................................H04b 7/02

[58] Field of Search............325/2, 3, 51, 56, 57, 113, 325/154, 158, 301, 302, 305; 343/177, 207, 208; 340/150, 179, 184, 185

[56] References Cited

UNITED STATES PATENTS

| | | | |
|---|---|---|---|
| 3,361,970 | 1/1968 | Magnuski | 325/56 |
| 3,453,544 | 7/1969 | Schweitzer | 324/127 |
| 3,363,181 | 1/1968 | Haywood | 325/158 X |

*Primary Examiner*—Richard Murray
*Assistant Examiner*—Barry Leibowitz
*Attorney*—Robert L. Lockwood

[57] ABSTRACT

For continuity in monitoring a variable, such as current flow, in a conductor of a high voltage electric power transmission line, prime and standby radio transmitters are mounted on each conductor of a polyphase system and are arranged to operate at the same nominal but slightly different carrier frequencies and at different field strength levels. A radio receiver for each set of prime and standby radio transmitters is located at a remote point, is responsive to both frequencies and both field strength levels and is arranged to control the operation of relaying and metering equipment and to indicate the operating status of the transmitters. Additionally, prime and standby receivers for each phase conductor are located at the remote point and are arranged to be responsive to a single transmitter on each phase conductor or to prime and standby transmitters on each phase conductor operating at independent carrier frequencies or to prime and standby transmitters on each phase conductor operating at the same nominal but slightly different carrier frequencies and at different field strength levels. Prime and standby relaying and metering equipment is operated by the prime and standby radio receivers. Signals received by the prime and standby radio receivers are combined to provide an indication of the operating status of the individual receivers.

15 Claims, 12 Drawing Figures

REDUNDANT, RADIO TRANSMITTER AND RECEIVER CONTROL SYSTEMS FOR TELEMETERING SYSEMS

This application is a continuation of application Ser. No. 777,402 filed Nov. 20, 1968 now abandoned.

The application of telemetering systems employing radio transmission in critical installations requires extreme reliability in the transmitter and receiver. In some cases, such as a radio transmission telemetering system installed in conjunction with a high voltage transmission line, it becomes impossible to gain access to the transmitter for normal maintenance and possible replacement, if required. Installation of second spare or redundant transmitter in such an application is desirable. If one transmitter fails, the second or spare transmitter becomes automatically and instantaneously available to take the place of the one that failed. In addition, an indication of the operating status of both transmitters is desirable in order to make the utility or the user aware of the failure of one of the transmitters. Replacement of the defective transmitter can be accomplished at a convenient time. An important object of this invention is to provide for controlling and sensing the output and operation of prime and standby radio transmitters installed on a high voltage electric power transmission line where access cannot be readily accomplished and reliability is of extreme importance.

In such a system the provision of prime and standby receivers is also important. While these receivers in the system above referred to for response to a variable of a high voltage conductor are located at ground potential and are accessible, still, to insure reliability and continuity of service it is important to indicate the operating status of these receivers so that steps can be taken promptly to restore a defective receiver or to replace it. A further object of this invention is to provide for controlling the output and sensing the operating status of the prime and standby receivers in a system where reliability is of the utmost importance.

Further objects of this invention are: To provide for continuity in monitoring a variable, such as current flow, in a conductor of a high voltage electric power transmission line when radio transmitting means mounted on the conductor and modulated by the variable is employed in conjunction with remotely located radio receiving means for controlling the operation of relaying and metering means; to employ a prime transmitter and a standby transmitter on the conductor and on each conductor of a polyphase system; to arrange the transmitters to transmit on the same nominal but slightly different carrier frequency and at different field strength levels; to utilize the transmission from either transmitter to control the relaying and metering means and the combination of both transmissions for indicating the operating status of the transmitters; to employ means responsive to the difference in the carrier frequencies for indicating the operating status of the transmitters; to employ means responsive to the difference in field strength levels for indicating the operating status of the transmitters; at the remote point to receive the transmission from both transmitters by a single radio receiver; to frequency modulate the carrier frequencies of the transmitters by the variable and to derive in the receiver frequency variation and amplitude variation components which result in a signal whose frequency is equal to the frequency difference of the carrier frequencies; to utilize the presence or absence of this signal to indicate the operating status of the prime and standby transmitters; to employ a prime radio receiver and a standby radio receiver at the remote point for operating in conjunction with either a single transmitter on the conductor or a prime transmitter and a standby transmitter on the conductor and to duplicate this equipment for each conductor of a polyphase system; to control the operation of prime and standby metering and relaying equipment by operation of the prime and standby radio receivers respectively; and to combine components of the outputs of the prime and standby receivers for controlling indicators showing the operating status of the individual receivers.

According to this invention provision is made for maintaining continuity of monitoring a variable, such as current flow in a high voltage electric power transmission line conductor. For this purpose two FM radio transmitters are mounted on the conductor and are modulated by the variable. In the systems here disclosed the variable is the current flow in the conductor. While this invention is disclosed with FM transmitters, AM transmitters can be employed, if desired.

The transmitters are differentiated by adjusting one, the prime transmitter, to operate at a higher field strength and with a slightly different carrier frequency than the other, the standby transmitter. A single FM receiver is responsive to both transmitters. Provision is made for indicating whether one or both of the transmitters are in operation. Frequency and amplitude variation components are present within the demodulated output of a single FM receiver as derived from the received signal from the two transmitters and are used to detect the operating status of the transmitters. The amplitude of the frequency variation component is a function of the field strength ratio of the two transmitters and of the frequency difference between their carrier frequencies.

$$(FM)_e = (f_p - f_s)\,(S/P)\,K$$

Where $(FM)_e$ is the amplitude of the effective frequency variation component; $f_p$ and $f_s$ are the prime and standby carrier frequencies, respectively; $S$ and $P$ are the prime and standby carrier field strengths, respectively; and $K$ is constant.

The amplitude of the amplitude variation component is a function only of the field strength ratio.

$$(AM)_e = (S/P)\,K$$

where $(AM)_e$ is the amplitude of the effective amplitude variation component; and $S$, $P$ and $K$ are as defined above.

Continuity of monitoring the current flow in the conductor is also accomplished by employing the prime and standby transmitters with prime and standby receivers. When this arrangement is used, the carrier frequencies are either slightly different or are independent. When they are independent, it is unnecessary to employ the frequency or amplitude variation components for differentiating purposes. Also a single transmitter can be used with two receivers which are adjusted to operate at the same carrier frequency.

The transmitting and receiving equipment is duplicated for each phase of a polyphase alternating current system.

In the drawings:

FIGS. 1A and 1B, the latter being placed to the right of the former, show diagrammatically and schematically a system for utilizing the frequency variation component in a receiver and prime and standby transmitters to control the operation of relaying and metering means and to indicate the operating status of the transmitters.

Figure 1A:
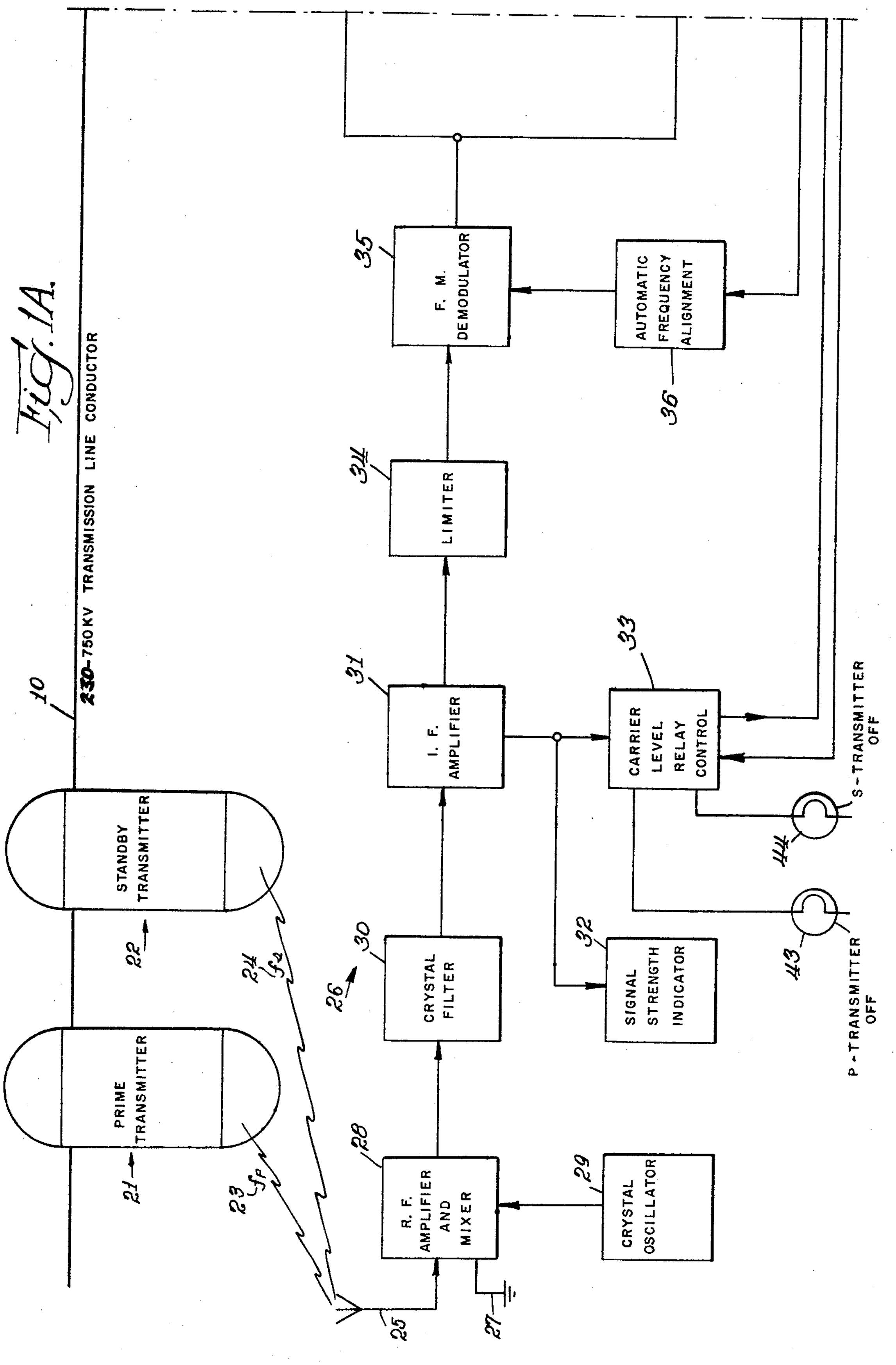
Figure 1B:
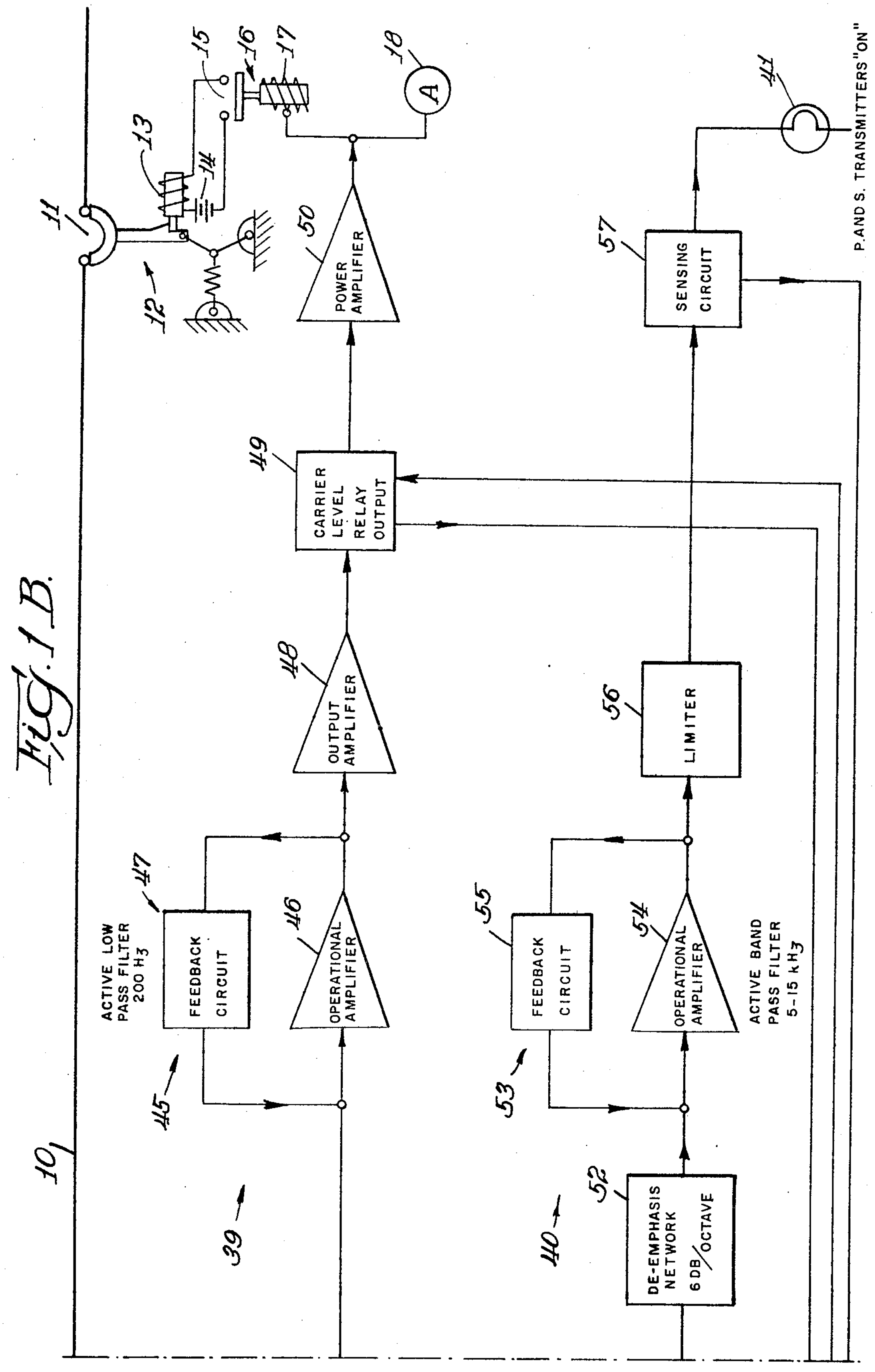
Figures 5A, 9:
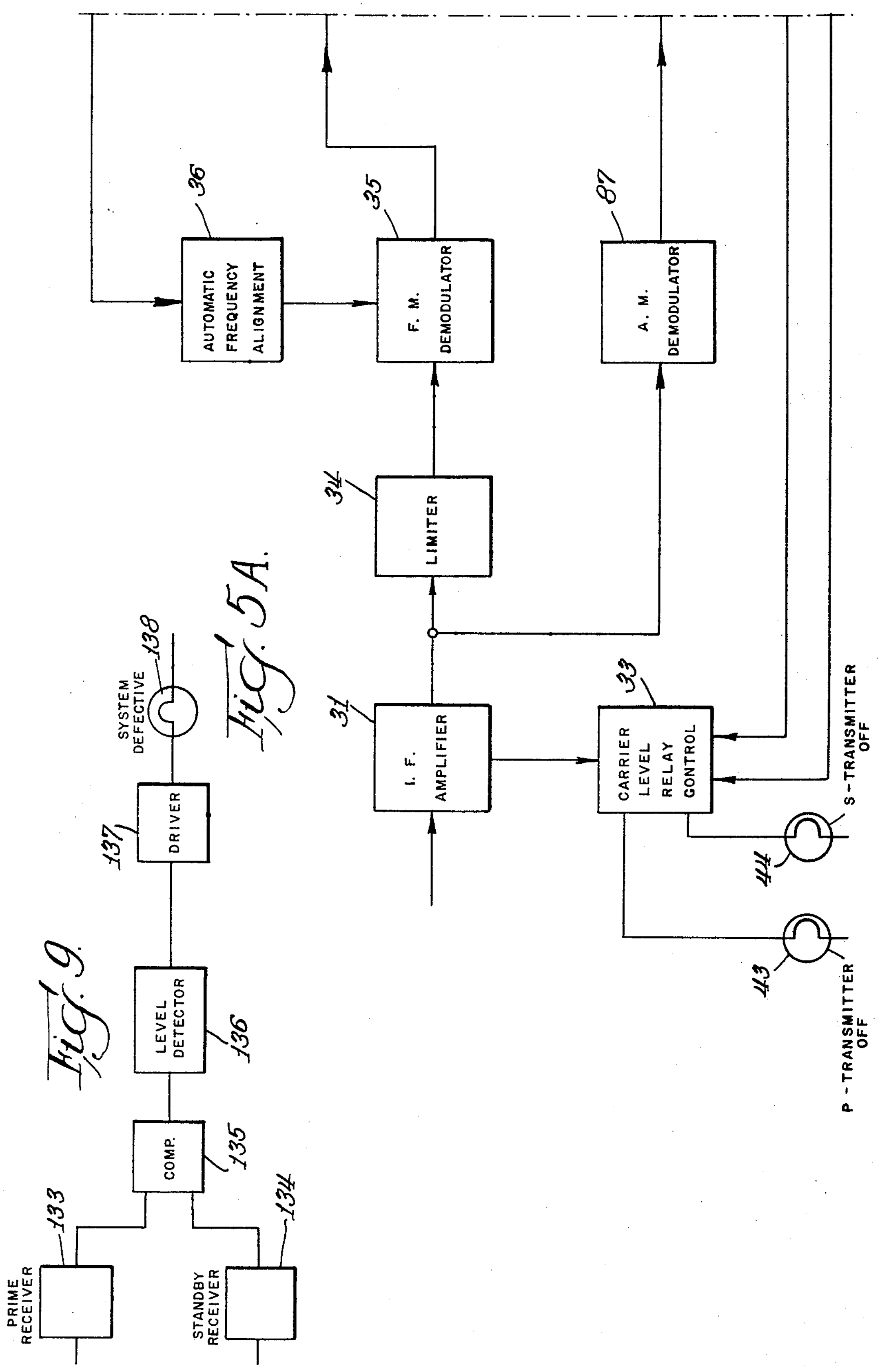
Figure 5B:
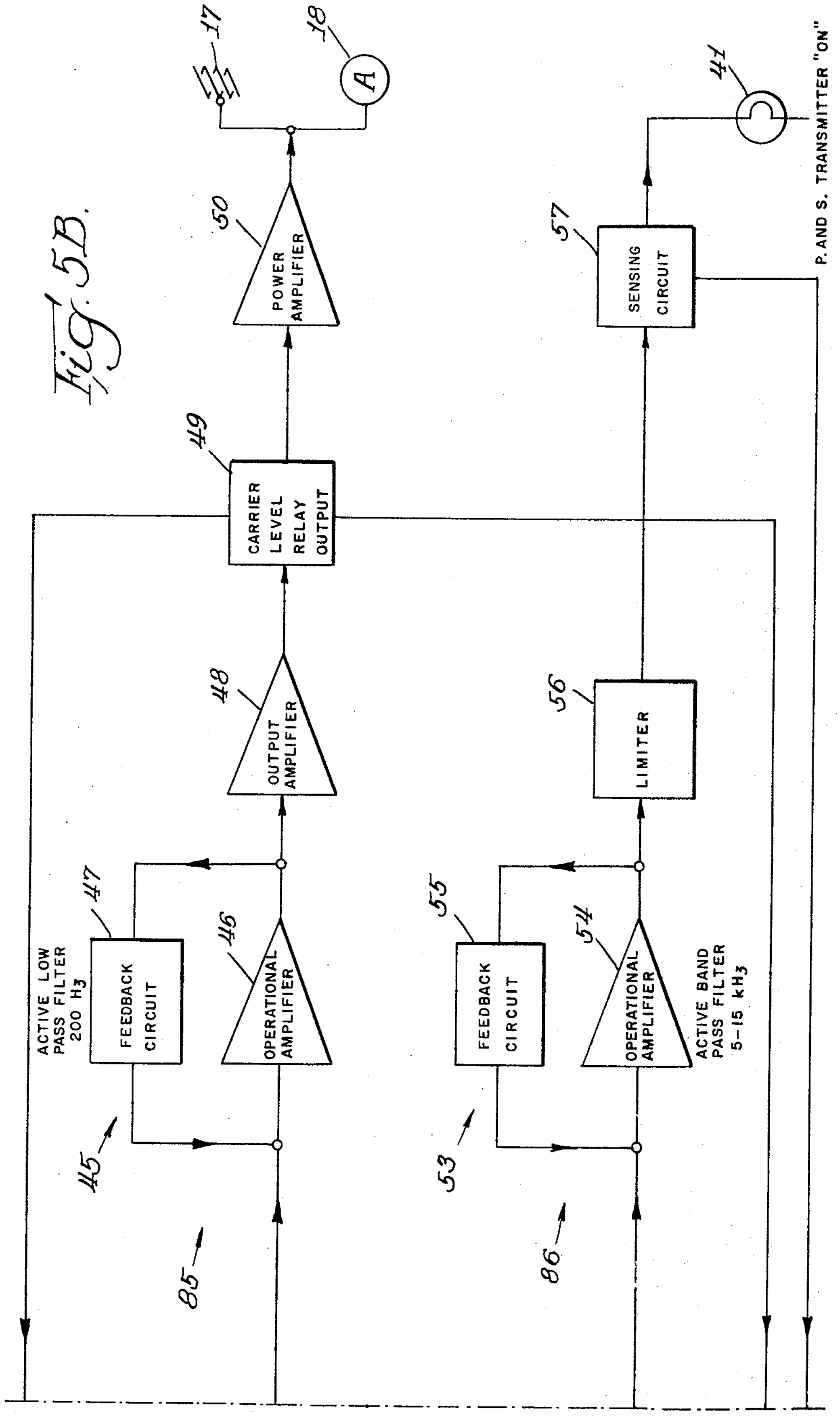

FIGS. 5A and 5B, the latter being placed to the right of the former, show diagrammatically a modification of the system shown in FIGS. 1A and 1B using the amplitude variation component of the received signal for indicating the status of the prime and standby transmitters.

Figure 6A:
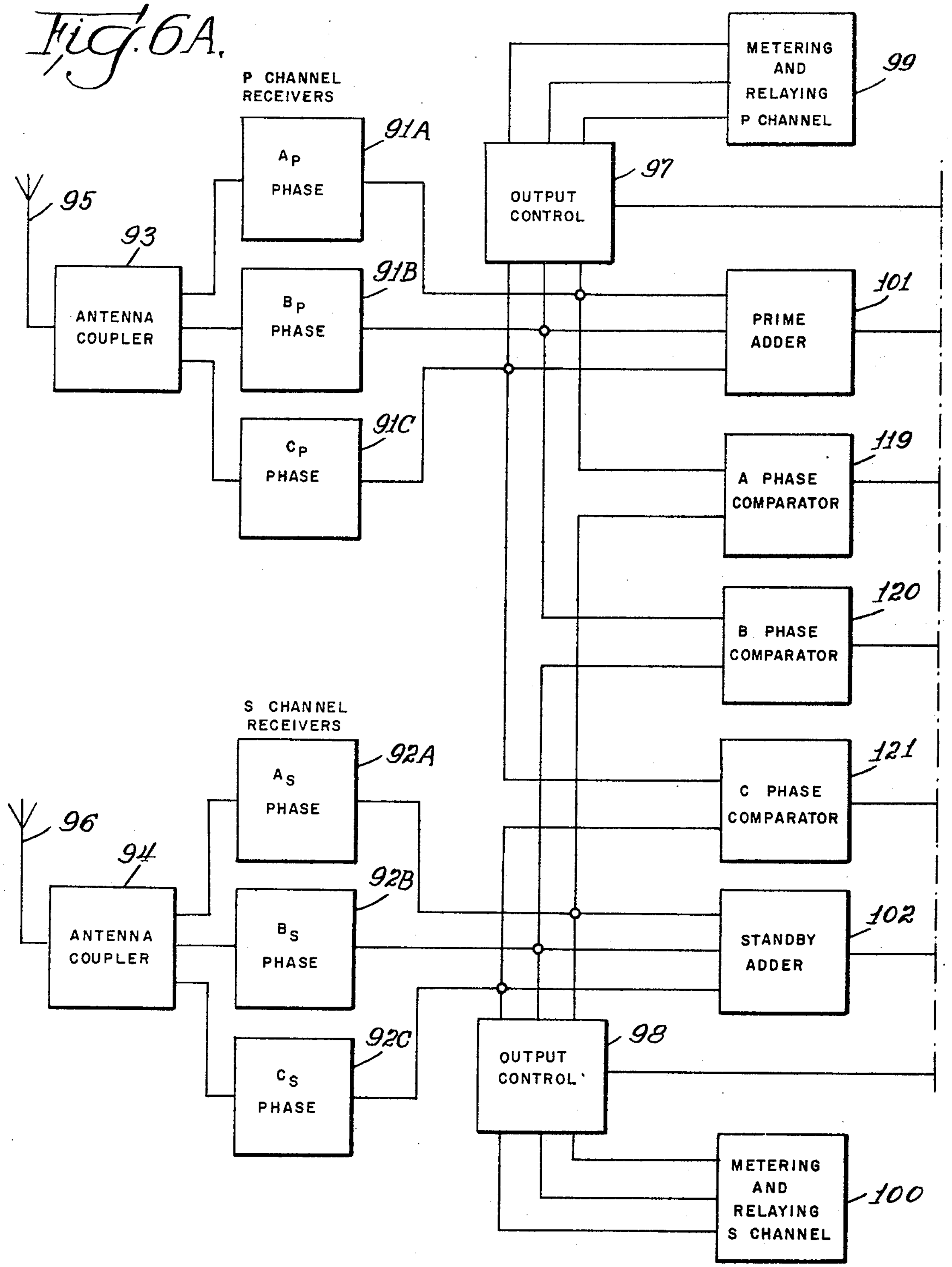
Figure 6B:
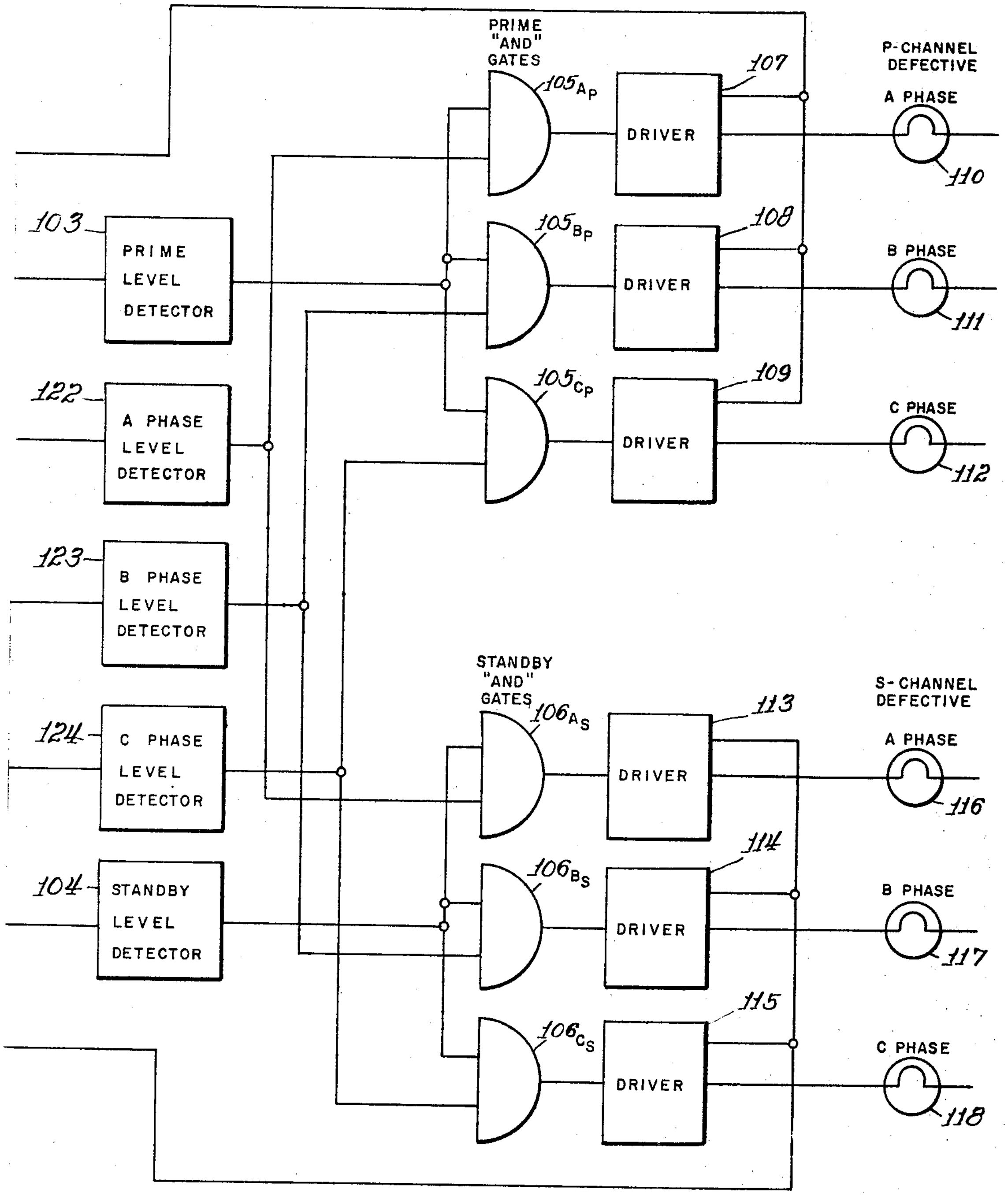

FIGS. 6A and 6B, the latter being placed to the right of the former, show a redundant receiver system for use in connection with polyphase conductors each having mounted thereon a single transmitter, or a prime transmitter and a standby transmitter, as shown in FIG. 1A, together with prime and standby metering and relaying equipment, and a system for combining the outputs of the several receivers to indicate the operating status thereof.

Figure 7:
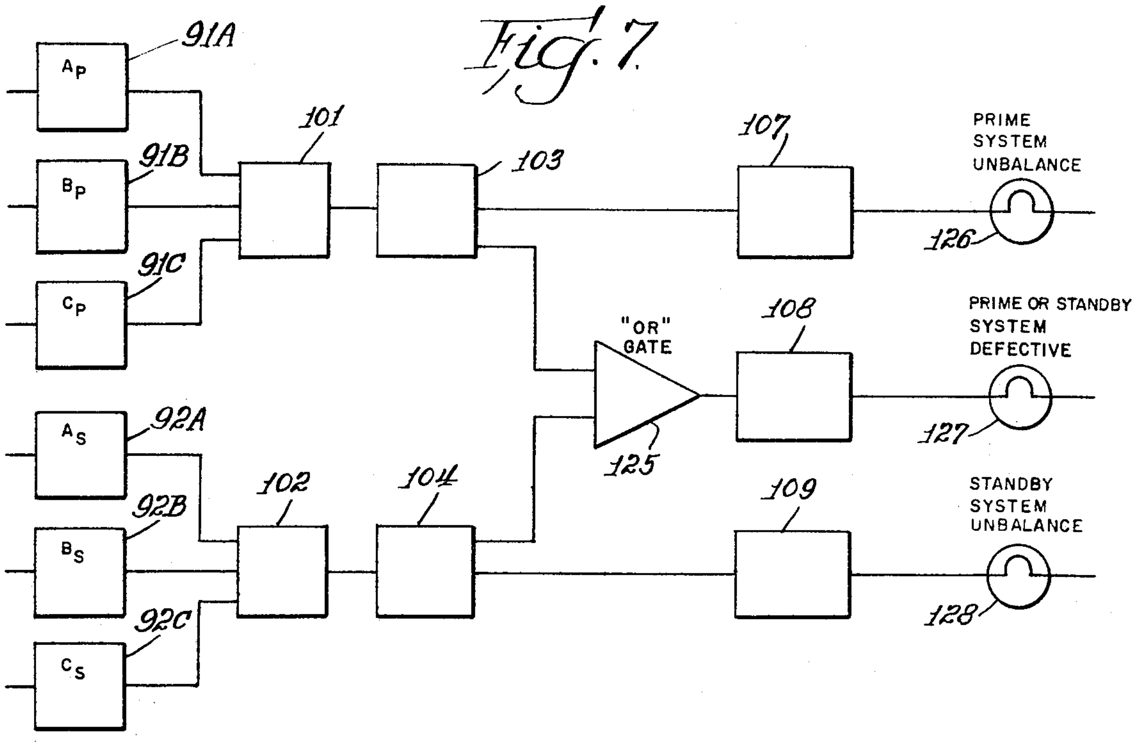

FIG. 7 shows a modification of the system illustrated in FIGS. 6A–B for detecting a defective channel in a redundant system, the phase comparators being omitted.

Figure 8:
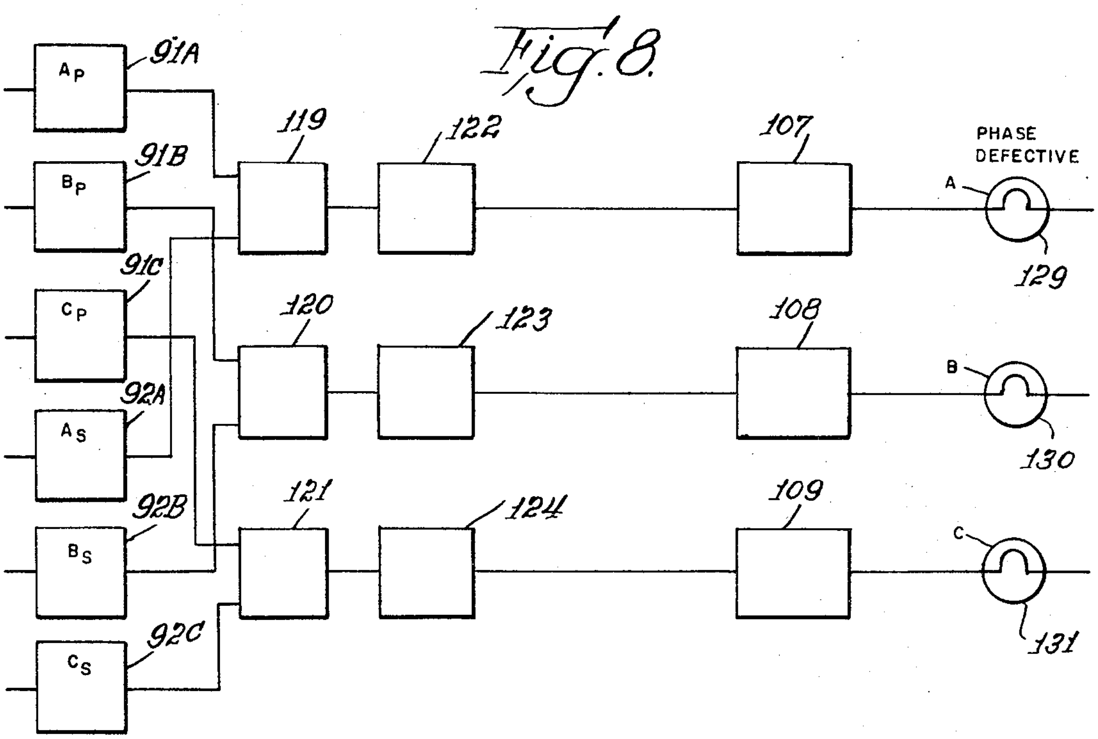

FIG. 8 shows a further modification of the system illustrated in FIGS. 6A–B for detecting a defective phase in a redundant system, the adders being omitted.

FIG. 9, sheet 5, shows a system for detecting a defective channel in a direct current high voltage transmission system using redundant receivers.

Before proceeding with the description of the use of two radio transmitters on a high voltage conductor to provide a redundant system, a mathematical analysis of their functioning is outlined to demonstrate the relationship set forth above between the frequency variation component, the carrier frequencies and their field strengths and between the amplitude variation component and the field strengths of the carrier frequencies. One transmitter (the prime transmitter) transmits a signal $p$ at a frequency having a certain field strength. The other transmitter (the standby transmitter) transmits a signal $s$ at a lesser field strength. These relationships can be represented by the following equations:

$$p = P \sin wt \quad (1)$$

$$s = S \sin w_1 t \quad (2)$$

where $p$ = prime instantaneous field strength micro V/meter $s$ = standby instantaneous field strength micro V/meter $P$ = prime crest instantaneous field strength micro V/meter $S$ = standby crest instantaneous field strength micro V/meter $w = 2\pi$ times frequency in Hz $t$ = time in seconds The resultant signal $r$ is the vectorial sum of $p$ and $s$, thus $$r = P \sin wt + S \sin w_1 t \quad (3)$$

Expressing $s$ in terms of $p$ $$r = P[\sin wt + x \sin (w + 2\pi\Delta_f)t] \quad (4)$$

Where $x = S/P$ (5) $\Delta_f = (f_p - f_s)$ (6) and $(w + 2\pi\Delta_f) = w_1$ (7) S/p $f_p$ = prime transmitter frequency in Hz $f_s$ = standby transmitter frequency in Hz Expansion of (4) yields:

$$r = P\,(1 + 2x\cos 2\pi\Delta_f t + x^2)^{1/2} \sin (wt + \phi) \quad (8)$$

$$\text{where } \phi = \tan^{-1} (x \sin 2\pi\, \Delta_f t)/1 + X\cos 2\pi\, \Delta_f t) \quad (9)$$

Equation (8) indicates that the resultant signal $r$ is in effect the prime carrier $p$ modified by amplitude and frequency variation components. The amplitude variation component is:

$$AM = (1 + x^2 + 2X\cos 2\pi\, \Delta_f t)^{1/2} \quad (10)$$

The frequency variation component is $\phi$ as defined by equation (9).

Manipulation of the amplitude variation component results in the following.

By expansion of (10) and assuming the ratio $x$ is less than 0.5, the effective amplitude variation component $(AM)_e$ due to the second carrier signal is:

$$(AM)_e = \sqrt{1+x^2}\,(C \cos 2\pi\Delta\, t - (C^2/4)\cos 4\pi\Delta_f t + (C^3/a) \cos 6\pi\Delta_f t - - -) \quad (11)$$

where $C = (X/1+X^2)$

If it is assumed that only the fundamental beat frequency $\Delta_f$ is of interest then the effective amplitude variation component reduces to $$(AM)_e = (\sqrt{1+x^2})\,(C) = x/\sqrt{1+x^2}) \quad (12)$$

For $x < 0.5$ this reduces for practical purposes to $$(AM)_e \approx x = S/P \quad (13)$$

The effective amplitude variation component is proportional to the ratio of the standby transmitter field strength to the prime transmitter field strength.

Analysis of the frequency variation effects is as follows:

Frequency variation is proportional to the first differential of phase modulation.

$$d\phi/dt = 2\pi f_{FM} \quad (14)\ f$$

where $f_{FM}$ is the frequency variation component or frequency deviation due to the standby carrier beating with the prime carrier. Differentiating (9) and dividing by $2\pi$ yields $$f_{FM} = \Delta_f x \cos 2\pi\Delta_f t \Delta_f x^2 \cos 4\pi\Delta_f t + \Delta_f x^3 \cos 6\pi\Delta_f t \text{ -(15)}$$

Assuming only the fundamental component $\Delta_f$ is of interest, then $$f_{FM} = \Delta_f x \cos 2\pi\Delta_f t \quad (16)$$

The effective degree of frequency variation referred to the maximum frequency deviation of the prime carrier is $$(FM)e\,\frac{\Delta_f x}{d_p} = \frac{(f_D - f_s)S}{P}\,\frac{1}{d_p} \quad (17)$$

where $d_p$ is maximum frequency deviation of the prime carrier. The effective frequency variation depth is proportional to the frequency difference between the prime and standby transmitter carrier signals and the field strength ratio between the two signals.

In FIGS. 1A–1B the reference character 10 designates a high voltage conductor such as one conductor of a three phase high voltage alternating current power transmission system. It may be energized, as indicated for example, at voltages ranging from 230 to 750 Kv. Also, conductor 10 may be energized with high voltage direct current. Connected in series with the conductor 10 are contacts 11 of a circuit interrupter that is indicated, generally, at 12 and includes a trip coil 13 that is arranged to be energized from a battery 14 on closure of contacts 15 of a control relay that is indicated, generally, at 16. The relay 16 has an operating coil 17 that is arranged to be energized under certain operating conditions, for example in the case of excess flow of current in the conductor 10. The magnitude of the current flow in the conductor 10 is indicated by an ammeter 18. Other relaying and metering equipment can be employed as may be desired.

For sensing and transmitting a variable of the conductor 10, such as the current flow therein, for operation of the relay 16 and ammeter 18 a prime radio transmitter, indicated generally at 21, and a standby transmitter, indicated generally at 22, are provided. The transmitters 21 and 22 are mounted on the conductor 10 and may be of the frequency modulated type. It is of utmost importance, as pointed out above, that there be continuity in the monitoring of the variable in the conductor 10. It is for this purpose that the prime transmitter 21 is employed in conjunction with the standby transmitter 22. Both transmitters are arranged to be modulated by a variable, such as the current flow, in the conductor 10 and to transmit signals continuously in accordance therewith. In the event that one or the other of the transmitters should cease to function properly, the other transmitter will continue to operate to transmit the necessary signals. However, it is desirable to indicate promptly that one or the other of the transmitters has ceased to function properly so that the necessary steps can be taken to restore the disabled transmitter to service.

As indicated, the prime transmitter 21 is arranged to transmit a signal including a prime frequency 23 indicated as $f_p$ while the standby transmitter 22 is arranged to transmit a standby carrier frequency 24 that is indicated as $f_s$. The frequencies $f_p$ and $f_s$ may be the same nominal frequency. For illustrative purposes the nominal frequency may be 100 MHz. However, the transmitters 21 and 22 are adjusted so that their carrier frequencies $f_p$ and $f_s$ are slightly different, on the order of 10 kHz. To further differentiate between the transmitters 21 and 22 they are adjusted to transmit at different field strength levels. For example, the prime transmitter 21 can be adjusted to transmit at 100 micro volts per meter while the standby transmitter 22 is adjusted to transmit at a field strength level of 50 micro volts per meter. The field strength ratio would therefore be 0.5.

The carrier frequencies $f_p$ and $f_s$, modulated by the variable, the current flow in the conductor 10, are received by an antenna 25 of a radio receiver that is indicated, generally, at 26 and is grounded at 27. The radio receiver 26 preferably is an FM receiver and it includes an R.F. amplifier and mixer 28 which has associated therewith a crystal oscillator 29. The output of the R. F. amplifier and mixer 28 is applied through a crystal filter 30 to an I. F. amplifier 31 which has associated therewith a signal strength indicator 32 and a carrier level relay control 33 the details of the circuitry of which will be set forth hereinafter. The output of the I. F. amplifier 31 is applied through a limiter 34 to an F.M. demodulator 35 which has associated therewith an automatic frequency alignment circuit 36.

The output of the F. M. demodulator 35 is applied to a first circuit that is indicated, generally, at 39 and to a second circuit that is indicated, generally, at 40. The first circuit 39 is arranged to control the operation of the operating coil 17 of the relay 16 and also of the ammeter 18. The second circuit 40 is arranged to control the energization of an indicating lamp 41 which, when energized, indicates that both of the transmitters 21 and 22 are functioning properly. In addition and associated with the carrier level relay control 33 are indicating lamps 43 and 44 which also are controlled by the second circuit to indicate, respectively, that the prime transmitter 21 and the standby transmitter 22 are not functioning properly or are off.

As shown in FIG. 1B the first circuit 39 includes an active low pass filter 45 consisting of an operational amplifier 46 and a feedback element 47 arranged in combination to readily pass frequencies at and below 200 Hz. An output amplifier 48 is driven by the active filter 45 and it feeds into carrier level relay output 49 which comprises relay contact circuitry shown in FIG. 3. From the carrier level relay output 49 a power amplifier 50 applies the signal to the operating coil 17 and the ammeter 18 or to other relay and metering devices as will be understood readily.

The second circuit 40 is somewhat similar to the first circuit 39. It includes a de-emphasis network 52 which may have an attenuation characteristic of 6 db/octave to compensate for an apparent accentuation of the signal of 6 db/octave due to the linear relationship between the degree of effective FM modulation and the frequency difference between the carrier frequencies $f_p$ and $f_s$. The output amplitude of the de-emphasis network 52 then is independent of the frequency difference and varies in amplitude only with the ratio of the field strength levels from the transmitters 21 and 22. The de-emphasis network 52 feeds into an active bandpass filter 53 consisting of an operational amplifier 54 and a feed back element 55. This bandpass filter 53 is arranged to remove all frequencies, primarily the information and signal and noise, except the wanted beat frequency between the carrier frequencies $f_p$ and $f_s$. Preferably the pass band of the filter 53 is relatively wide. For example, it may be arranged to pass frequencies in the band 5–5 kHz in order to accommodate variable drift of both transmitters 21 and 22 on the order of + or − 0.005 percent at 100 MHz. The second circuit 40 also includes a limiter 56 which is employed for the purpose of eleminating amplitude variations due to the ratio of the field strength levels. The limiter 56 can be set to remove any signal amplitude variation resulting from field strength ratios greater than 0.25 on the assumption that the nominal ratio is 0.5 and will never fall below a 0.25 level. A sensing circuit 57 is connected to the limiter 56 for the purpose of responding to the presence or absence of an output signal from the limiter for the purpose of controlling the operation of the indicating lamp 41. Instead of the indicating lamp 41 an alarm signal, such as a bell, can be employed or the winding of a relay can be used and arranged to control the operation of contacts for various signalling purposes as will be understood readily.

Figures 2, 3:
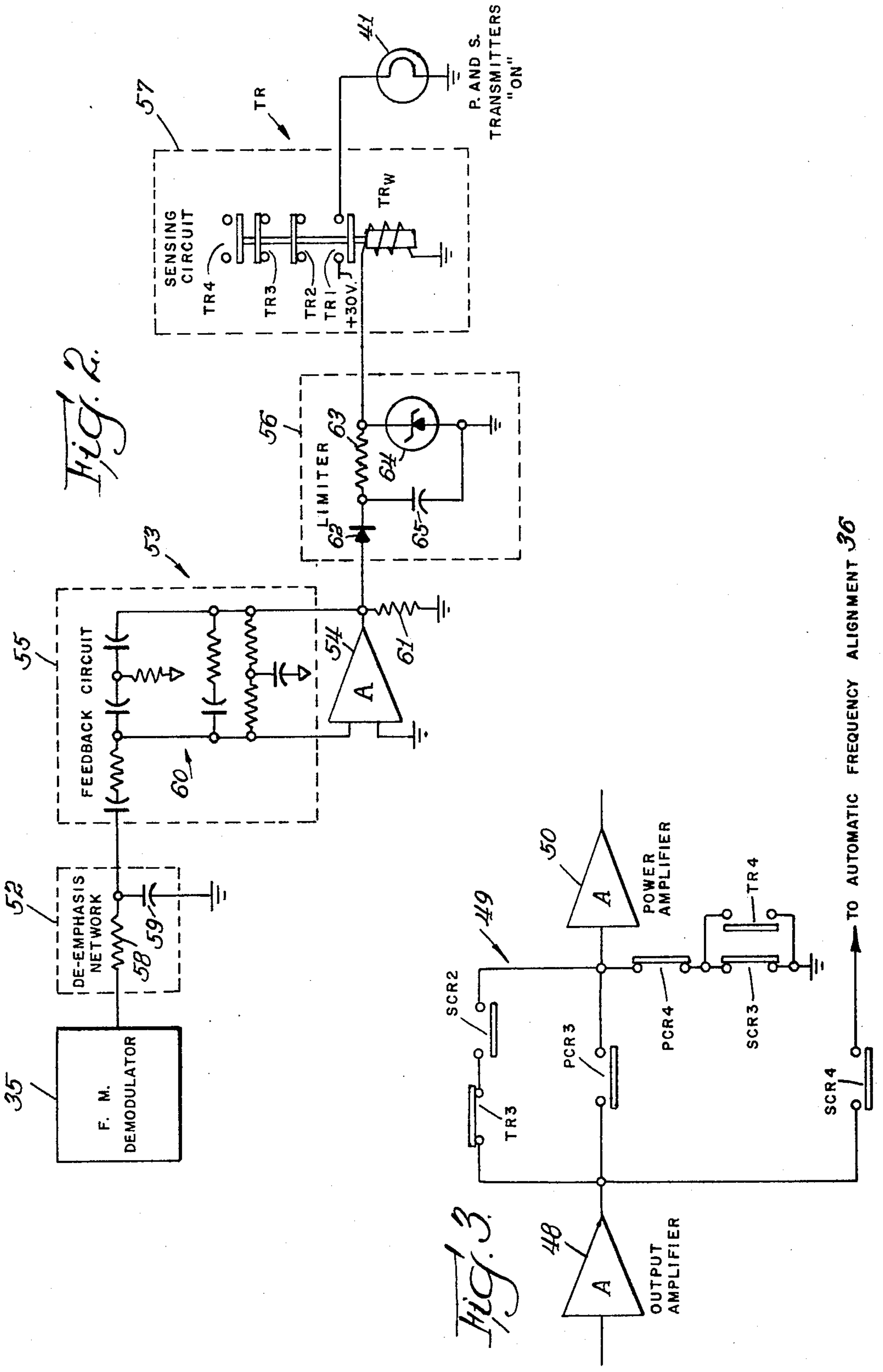
FIG. 2 shows diagrammatically and in detail the circuit elements employed in the de-emphasis network, band pass filter, limiter and sensing circuit shown in FIG. 1B.
FIG. 3 shows diagrammatically and in detail the circuit connections and contacts included in the carrier level relay output indicated in FIG. 1B.

FIG. 2 shows in detail the elements and circuit connections employed for the de-emphasis network 52, feed back circuit 55, limiter 56 and the sensing circuit 57. The deemphasis network 52 comprises an RC network having a 6 db/octave roll off characteristic in the form of a resistor 58 and a capacitor 59 which, as shown, is connected to ground. The feedback circuit 55 employs a resistor and capacitor network 60 in combination with the operational amplifier 54 with the arrangement being such as to provide the active filter 53 with the proper cut off frequencies. The limiter 56 includes a rectifying diode 62 in conjunction with a resistor 63 and a zener diode 64 which is connected to ground. A capacitor 65 provides filtering of the signal and a time constant to prevent operation of the sensing circuit 57 due to noise bursts having energy within the pass band of the band pass filter 53. The arrangement and construction of the limiter 56 are such as to provide a half wave clipped output signal having an adequate direct voltage level for energizing the sensing circuit 57.

The sensing circuit 57 comprises a relay TR having an operating winding TRw which is energized by the direct voltage output from the limiter 56. The relay TR has normally open contacts TR1, normally closed contacts TR2 and TR3 and normally open contacts TR4. When the operating winding TRw is energized, contacts TR1 are closed and the indicating lamp 41 is energized to indicate that both the prime transmitter 21 and the standby transmitter 22 are in operation or are "ON."

Figure 4:
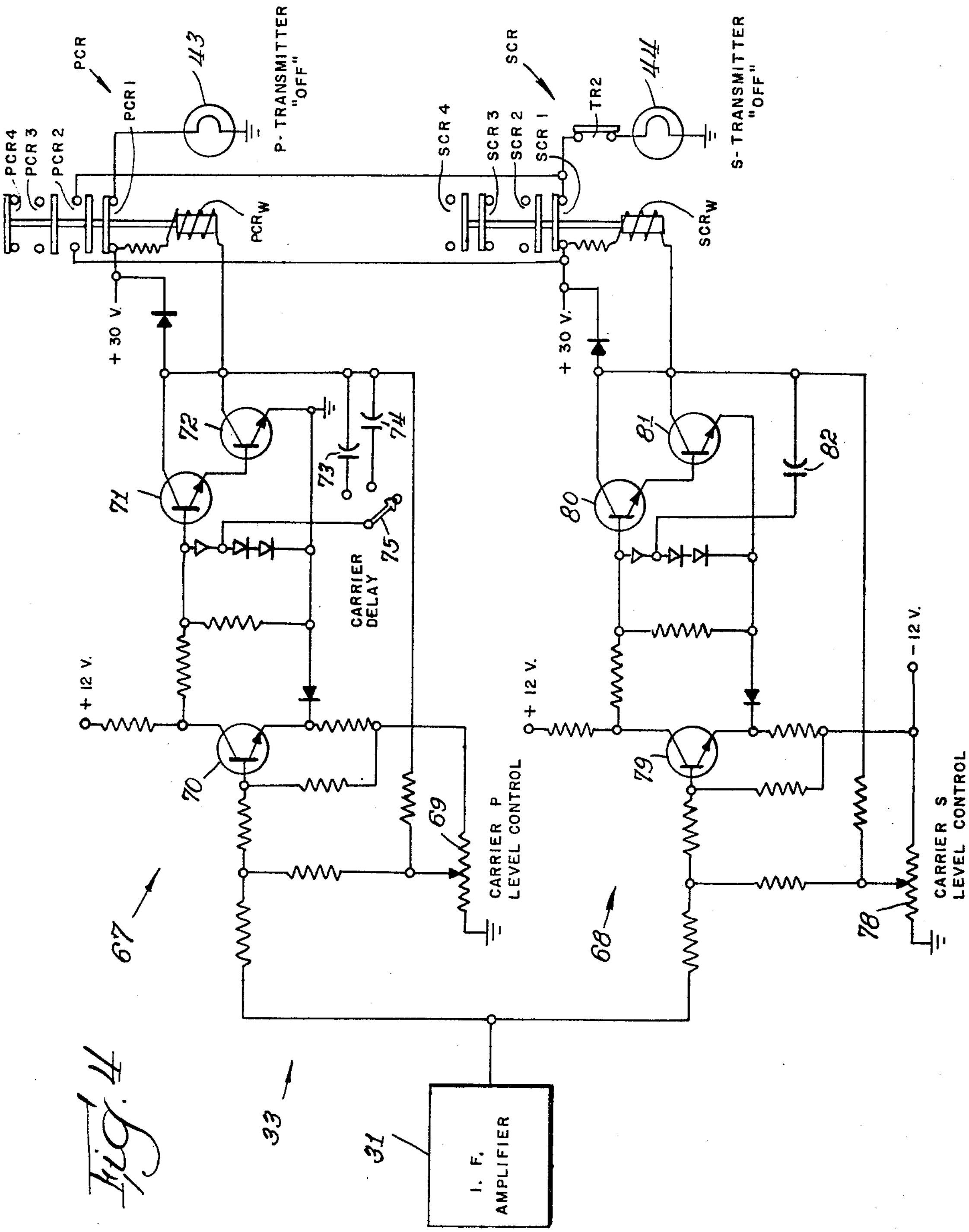
FIG. 4 shows diagrammatically and in detail the circuit connections that are indicated in FIG. 1A as carrier level relay control.

FIG. 4 shows the elements employed in and the circuit connections for the carrier level relay control 33. The system employs a prime carrier level relay control circuit that is indicated, generally, at 67 and a standby carrier level relay control circuit that is indicated, generally, at 68. The control circuit 67 includes a level control potentiometer 69 which is adjustable to vary the functioning of the control circuit 67 in accordance with the field strength level of the prime transmitter 21. The control circuit 67 also includes transistors 70, 71 and 72 connected as illustrated. An adjustable carrier delay is provided by capacitors 73 and 74 in conjunction with a switch 75. The control circuit 67 is arranged to control the operation of a prime control relay PCR which has an operating winding PCRw that is arranged to be energized from the control circuit 67. The relay PCR includes normally closed contacts PCR1, normally open contacts PCR2 and PCR3 and normally closed contacts PCR4. When the operating winding PCRw is energized, contacts PCR1 are open and indicating lamp 43 is deenergized. When the lamp 43 is energized, it indicates that the prime transmitter 21 is in the non-operating or "OFF" condition.

The standby carrier level relay control circuit 68 is similar to the prime carrier level relay control circuit 67. It includes a level control potentiometer 78 which is adjusted to control the operation of the control circuit 68 in accordance with the field strength level of the standby transmitter 22. Also, the control circuit 68 includes transistors 79, 80 and 81. A capacitor 82 is employed for introducing a time delay in the operation of a standby control relay that is indicated, generally, at SCR with respect to the time required for operation of the relay TR. The standby control relay SCR includes an operating winding SCRw that is energized from the control circuit 68. It includes normally closed contacts SCR1, normally open contacts SCR2, normally closed contacts SCR3 and normally open contacts SCR4. When the operating winding SCRw is deenergized, contacts SCR1 are closed to complete an energizing circuit for the indicating lamp 44 on closure of contacts TR2 on deenergization of the relay TR.

FIG. 3 shows the circuit connections for the carrier level relay output circuitry 49 between the amplifier 48 and 50. It comprises contacts of the relay TR, prime control relay PCR and standby control relay SCR.

In describing the operation of the system shown in FIGS. 1A and 1B, employing the circuit connections shown in FIGS. 2, 3, and 4, it will be assumed first that the conductor 10 is energized but that the current flow therethrough is insufficient to cause operation of the prime transmitter 21 and the standby transmitter 22 both of which are assumed to be in proper operating condition. Under these circumstances the carrier frequency $f_p$ from the prime transmitter 21 and the carrier frequency $f_s$ of standby transmitter 22 are not being received by the FM receiver 26. Accordingly, the relay TR is not energized and its contacts TR1 are open with the result that indicating lamp 41 is deenergized. Also, relays PCR and SCR are deenergized. Contacts PCR1 are closed and indicating lamp 43 is energized to indicate that the prime transmitter 21 is not operating or is in the "OFF" condition. Also, relay SCR is deenergized and its contacts SCR1 are closed. Since the relay TR is deenergized, its contacts TR2 are closed and indicating lamp 44 is energized to indicate that the standby transmitter 22 is not operating or is in the "OFF" condition.

Next it will be assumed that sufficient current flows through the conductor 10 or other steps are taken to place the prime transmitter 21 and the standby transmitter 22 in operation so that their carrier frequencies $f_p$ and $f_s$ are received by the radio receiver 26 modulated as a function of the variable of the conductor 10. The ammeter 18 shows an indication of the magnitude of the current flow in the conductor 10 and the operating coil 17 is arranged to be energized on flow of predetermined current in the conductor 10 for tripping the circuit interrupter 12 and opening the circuit through the contacts 11. When the current flow in the conductor 10 falls below a predetermined level or the variable to which the transmitters 21 and 22 are responsive is not being transmitted and their carrier frequencies $f_p$ and $f_s$ disappear, then the indicating lamp 41 is deenergized and the indicating lamps 43 and 44 are energized in an obvious manner.

Next it will be assumed that the standby transmitter 22 is not in operating condition and sufficient current flows through the conductor 10 or other action takes place to cause the prime transmitter 21 to operate and transmit its carrier frequency $f_p$ to the receiver 26. The prime control relay PCR is operated on energization of operating winding PCRw to open contacts PCR1 and PCR4 and close contacts PCR2 and PCR3. The operating winding SCRw of the standby control relay SCR also is energized due to operation of the prime transmitter 21 alone since the field strength level at which it operates is above that for which the level control potentiometer 78 is set. Accordingly, contacts SCR1 and SCR3 are opened and contacts SCR2 and SCR4 are closed. However, because the standby transmitter 22 is not operating, no beat frequency signal is detected. As a result the relay TR remains inoperative since its winding TRw is not energized. The first circuit 39 continues in operation as previously described. The output of amplifier 48 is applied to the power amplifier 50 through contacts PCR3 and contacts TR3 and SCR2 in parallel. Since contacts PCR4 are open, the ground to the amplifier 50 is removed. Because relay TR is not energized its contacts TR1 are open and indicating lamp 41 is deenergized to indicate that one of the transmitters 21 or 22 is not operating. Indicating lamp 43 remains deenergized since the prime transmitter 21 is in operation. However, indicating lamp 44 is energized since contacts TR2 are closed in series with contacts PCR2. Steps then can be taken to restore the standby transmitter 22 to operation.

Next it will be assumed that the prime transmitter 21 is not capable of transmitting its carrier frequency $f_p$ and that the standby transmitter 22 continues to operate. The prime control relay PCR is not energized since the field strength level as adjusted by the potentiometer 69 is above the level for which the standby transmitter 22 is set to operate. The standby control relay SCR is energized opening contacts SCR1 and SCR3 and closing contacts SCR2. Because the prime transmitter 21 is not operating, there is no beat frequency signal to be detected and the transmitter relay TR remains deenergized. Its contacts TR1 are open and indicating lamp 41 is deenergized to indicate that one of the transmitters 21 or 22 is not operating. The output circuit from the amplifier 48 to the power amplifier 50 is completed through contacts TR3 and SCR2. Ground is removed since contacts SCR3 and TR4 are open. Indicating lamp 43 is energized since contacts PCR1 are closed to indicate that the prime transmitter 21 is in the "OFF" condition. Indicating lamp 44 is not energized since contacts PCR2 and SCR1 are open. Suitable steps then can be taken to restore the prime transmitter 21 to operative condition.

Now it will be assumed that both of the transmitters 21 and 22 are not operating or are "OFF" and a noise signal appears in the receiver 26 which is adequate to cause the standby control relay SCR to be energized because of the relatively low setting of the level control potentiometer 78. However, the noise signal is assumed as not being large enough to effect the energization of the prime control relay PCR because of the higher setting for the level control potentiometer 69. As a result of the assumed noise signal, standby control relay SCR is energized, opening its contacts SCR1 and SCR3 and closing its contacts SCR2 and SCR4. Since the noise signal contains high frequency components, an output is derived from the beat frequency sufficient to effect the energization of the transmitter relay TR. However, there is no output to the power amplifier 50 since contacts PCR4 and TR4 are closed, connecting the amplifier 50 to ground. As pointed out the capacitor 82, FIG. 4, is provided in the standby control circuit 68 to delay the operation of the standby control relay SCR for the purpose of allowing contacts TR3 to open and contacts TR4 to close before contacts SCR2 close and SCR3 open.

FIGS. 5A – 5B show a modification of the circuits illustrated in FIGS. 1A – 1B for the purpose of making use of the amplitude variation signal that results from a transmission of the two carrier frequencies $f_p$ and $f_s$ from the prime and standby transmitters 21 and 22. For indicating the operative status of the transmitters 21 and 22 the system as modified by FIGS. 5A – 5B is responsive solely to the amplitude of the amplitude variation component caused by the mixing of the carrier signals from the transmitters 21 and 22. The amplitude of this component is proportional to the field strength ratio and is independent of the beat frequency between the transmitter carrier frequencies. It will be observed that first and second circuits 85 and 86 are employed which are similar to the first and second circuits 39 and 40 previously described. The circuit 86 does not employ the de-emphasis network 52. Further the first circuit 85 is employed for applying the output of the FM demodulator 35 in the manner previously described for controlling the energization of the operating coil 17 of the relay 16 and the energization of the ammeter 18 or other metering equipment. For detecting the amplitude variation an AM demodulator 87 is employed and it is connected, as indicated in FIG. 5A, to the output of the I.F. amplifier 31. The input to the AM demodulator 87 is derived directly from the I.F. amplifier and before limiting by the limiter 34 in order to preserve the amplitude variation signal containing the beat frequency resulting from the slight difference in the carrier frequencies $f_p$ and $f_s$. The AM demodulator 87 is a conventional detector circuit utilizing semi-conductor diodes. As pointed out the de-emphasis network 52 is not required in the system shown in FIGS. 5A – 5B since the amplitude of the amplitude variation demodulated signal is proportional only to the ratio of the field strength levels and not to the frequency difference between the carrier frequencies $f_p$ and $f_s$. Using the system shown in FIGS. 5A – 5B the indicating lamps 41, 43 and 44 are controlled in the manner previously described in connection with the system shown in FIGS. 1A – 1B for indicating the operating status of the prime transmitter 21 and the standby transmitter 22.

FIGS. 6A – 6B show a system for monitoring prime and standby receivers, for the purpose of insuring continuity in reception from a single transmitter or two transmitters, such as those indicated at 21 and 22 in FIG. 1A. In FIG. 6A there are disclosed prime FM receivers 91A, 91B and 91C, each for the corresponding phase of a three phase high voltage transmission system. Likewise there are provided FM standby receivers 92A, 92B and 92C for the corresponding phases. Antenna couplers 93 and 94 commonly connect the receivers 91A–B–C and 92A–B–C to antenna 95 and 96. It will be understood that each of the receivers is identical in construction and operation to the FM receiver 26 shown in FIGS. 1A–1B or as there shown and modified in FIGS. 5A – 5B. For the different channels, the various receivers are tuned to frequencies individual to the several phases.

Output controls 97 and 98 are connected to the prime receivers 91A, B and C and to the standby receivers 92A, B and C, respectively, for controlling the operation of the respective metering and relaying circuits 99 and 100. The circuits 99 and 100 include metering and relaying equipment, such as that illustrated in FIG. 1B for one phase, with the arrangement being such that on the occurrence of a fault on one phase the circuit interrupters for all three phases are simultaneously opened. The metering equipment is individual to each of the phases and is provided in duplicate by the circuits 99 and 100.

The polyphase system shown in FIG. 6A can be operated in conjunction with a single transmitter, such as the transmitter 21, for each phase conductor. If only a single transmitter is employed, then the second circuits 40 and 86 and the associated circuitry are not employed.

Alternatively the prime and standby transmitters 21 and 22 can be utilized for operation in conjunction with the prime receivers 91A, B and C and 92A, B and C with reliance placed on the difference in the carrier frequencies and the difference in field strength levels for detecting the operating status of the respective prime and standby transmitters.

A still further combination is the provision of two transmitters per phase arranged to transmit on independent carrier frequencies with the receivers 91A, B and C and 92A, B and C, respectively, tuned to these independent frequencies.

As shown in FIG. 6A the outputs of the prime receivers 91A, B and C are applied to an output control 97 while the outputs of the standby receivers 92A, B and C are applied to an output control 98. The controls 97 and 98 are connected, respectively, to metering and relaying circuits 99 and 100 which include the metering and relaying equipment illustrated in FIG. 1B, for example, in duplicate for each phase.

In order to provide for monitoring the receivers 91A, B and C and 92A, B and C and in certain instances the operation of the transmitters when two transmitters per phase are employed operating on independent frequencies, prime and standby adders 101 and 102 are connected to the outputs of the prime receivers 91A, B and C and the standby receivers 92A, B and C, respectively. In turn, the adders 101 and 102 are connected to prime and standby level detectors 103 and 104. The prime level detector 103 is commonly connected to prime "AND" gates $105A_p$–$B_p$ and $C_p$. In like manner the standby level detector 104 is commonly connected to standby "AND" gates $106A_s$–$B_s$ and $C_s$. The prime "AND" gates are connected to drivers 107, 108 and 109 which provide the necessary power for energizing indicator lamps 110, 111 and 112 for each of the phases for each of the receivers 91A, B and C. In a similar manner drivers 113, 114 and 115 are arranged to be controlled by the standby "AND" gates for supplying power for energizing indicators lamps 116, 117 and 118 for each of the phases for each of the standby receivers 92A, B and C.

For the purpose of comparing the operation of the prime and standby receivers for each phase, A, B and C comparators 119, 120 and 121 are connected, respectively, to the receivers 91A and 92A, 91B and 92B and 91C and 92C. Associated with the phase comparators are A, B and C phase level detectors 122, 123 and 124. The A phase level detector 122 is commonly connected to the "AND" gates $105A_p$ and $106A_s$, the B phase level detector 123 is commonly connected to the prime "AND" gates $105B_p$ and $106B_s$, and the C phase level detector 124 is commonly connected to the "AND" gates $105C_p$ and $106C_s$.

Under normal operating conditions the sum of the phase currents of the three phase alternating current power transmission line is zero or within some maximum level, depending upon the power system conditions. This is reflected in the outputs of the receivers 91A, B and C applied to the prime adder 101 and outputs of the standby receivers 92A, B and C applied to the standby adder 102. If the output of one or more of the prime or standby receivers changes to zero or to some unrelated magnitude as the result of a malfunction in either the transmitting or receiving equipment, an output is obtained from the corresponding adder 101 or 102. Depending upon the anticipated phase current unbalance, a threshold level is selected above which an unbalance from the adder 101 or 102 is considered abnormal. Upon reaching the selected level due to a malfunction, an output is derived from the prime level detector 103 or 104 as applied thereto by the adder 101 or 102. As pointed out above, the outputs from the receivers for the same phase are commonly connected to the comparators 119, 120 and 121 and applied to the associated level detectors 122, 123 and 124 which are set at appropriate values to sense the unbalance of the two outputs from the same phase receivers. When that unbalance reaches this preset level an output from the respective level detector 122, 123 or 124 is received. The logic circuits comprising the prime and standby "AND" gates are employed to sense the status of the adder circuit outputs and the per phase comparator circuit output. This permits an evaluation of the output signals to select the defective transmitter or receiver of a particular phase. A signal must be present from both the adder circuit and the phase comparator circuit to operate any one of the "AND" gates which in turn operate through the respective driver to energize the indicator lamp corresponding to the defective transmitter or receiver. It will be understood that suitable audible alarms can be sounded or other action taken to made known the presence of the defective apparatus.

If desired, the prime and standby adders 101 and 102 can be employed without the comparators 119, 120 and 121. Likewise the comparators 119, 120 and 121 can be employed without the adders 101 and 102. In either modification, the prime "AND" gates are not required.

FIG. 7 illustrates how the system shown in FIGS. 6A–B can be modified for detecting a defective channel in a redundant system. It will be noted that the comparators and the "AND" gates are not employed. As before the outputs of the prime channel receivers and the standby channel receivers are combined in adders 101 and 102 and fed to the level detectors 103 and 104. The level detectors 103 and 104 feed directly to drivers 107 and 109 and also to an "OR" gate 125 which feeds into a driver 108. Indicating lamps 126, 127 and 128, when lighted, show respectively prime system unbalance, prime or standby system defective and standby system unbalance.

FIG. 8 shows a further modification of the system shown in FIGS. 6A–B for the purpose of detecting a defective phase in a redundant system. As before the respective channel receivers for the respective phases feed into the phase comparators 119, 120 and 121 which, in turn, feed into level detectors 122, 123 and 124 for energizing drivers 107, 108 and 109 which have associated therewith indicating lamps 129, 130 and 131 which, when lighted, indicate that the respective phase is defective.

FIG. 9 shows how the present invention can be employed in conjunction with a high voltage direct current transmission system. It is assumed that the high voltage direct current transmission system comprises a single polarity high voltage conductor with a ground return. However, the same approach would be employed if two high voltage direct current conductors are employed. Prime and standby transmitters are mounted on the high voltage direct current conductor and function in the manner described hereinbefore for transmitting to prime and standby receivers 133 and 134 signals corresponding to the current flow in the conductor. The outputs of the receivers 133 and 134 are fed into a comparator 135 and thereby to a level detector 136 which energizes a driver 137 to control the energization of an indicating lamp 138. When it is lighted, it indicates that one of the transmitter-receiver systems is defective and that steps should be taken to correct it.

What is claimed as new is:

1. In a system for transmitting signals corresponding to a variable of a high voltage conductor and receiving said signals at a remote point in combination prime and standby radio transmitters on said conductor arranged to transmit simultaneously said signals by slightly different carrier frequencies and slightly different field strength levels, and a single ratio receiver at said remote point responsive to both said slightly different carrier frequencies of said slightly different field strength levels for generating a frequency variation component derived from mixing of the carrier signals, which is proportional in magnitude to the frequency difference of the carrier signals, and an amplitude variation component derived from mixing of the carrier signals, which is proportional in magnitude to the ratio of the field strengths of the carrier signals, said frequency variation component lying within the bandpass characteristics of the RF and IF component's of the receiver.

2. In a system according to claim 1 wherein the difference in carrier frequencies is of the order of 0.010 percent and the ratio of the field strengths is of the order of 0.5.

3. In the system according to claim 1 wherein said radio receiver includes first circuit means responsive to the signals corresponding to said variable at either frequency and either field strength level for controlling the operation of a device in accordance with said variable, second circuit means responsive to said frequency variation component, and means operated by said second circuit means for indicating whether said carrier frequencies are being transmitted by said transmitters.

4. In the system according to claim 3 wherein said second circuit means comprises a sensing circuit including a relay that is energized when both carrier frequencies are being received, and said means for indicating whether said carrier frequencies are being transmitted includes a signalling device controlled by said relay.

5. In the system according to claim 3 wherein said first circuit means includes relatively low pass filter means to prevent the difference frequency between said carrier frequencies from affecting the operation of said device, and said second circuit means includes band pass filter means to prevent the modulation signal frequencies outside its pass band from affecting the operation of said indicating means.

6. In the system according to claim 1 wherein said radio receiver includes first circuit means responsive to the signals corresponding to said variable at either frequency and either field strength level for controlling the operation of a device in accordance with said variable, second circuit means responsive to said amplitude variation component, and means operated by said second circuit means for indicating whether said carrier frequencies are being transmitted.

7. In the system according to claim 6 wherein said second circuit means comprises a sensing circuit including a relay that is energized when both transmitters are operating, and said means for indicating whether said carrier frequencies are being transmitted includes a signalling device controlled by said relay.

8. In the system according to claim 6 wherein said first circuit means includes relatively low pass filter means to prevent the difference frequency between said carrier frequencies from affecting the operation of said device, and said second circuit means includes band pass filter means to prevent the modulation signal frequencies outside its pass band from affecting the operation of said indicating means.

9. In a system for transmitting signals corresponding to a variable of polyphase conductors of a high voltage alternating current electric power transmission line and receiving said signals at a remote point in combination radio transmitting means on each conductor arranged to transmit a signal individual to a variable thereof by a carrier frequency individual thereto, prime and standby radio receivers for each phase conductor at said remote point simultaneously responsive to the carrier frequency of the respective radio transmitting means, means individual to each prime and standby radio receiver for indicating whether it is receiving the respective carrier frequency and is capable of receiving the same, prime and standby adder means responsive respectively to said prime and standby radio receivers, and prime and standby level detector means responsive respectively to said prime and standby adder means for operating said indicating means.

10. In a system for transmitting signals corresponding to a variable of polyphase conductors of a high voltage alternating current electric power transmission line and receiving said signals at a remote point in combination radio transmitting means on each conductor arranged to transmit a signal individual to a variable thereof by a carrier frequency individual thereto, prime and standby radio receivers for each phase conductor at said remote point simultaneously responsive to the carrier frequency of the respective radio transmitting means, means individual to each prime and standby radio receiver for indicating whether it is receiving the respective carrier frequency and is capable of receiving the same, phase comparator means responsive to said prime and standby receivers for each phase, and phase level detector means responsive respectively to said phase comparator means for operating said indicating means.

11. In a system for transmitting signals corresponding to a variable of polyphase conductors of a high voltage alternating current electric power transmission line and receiving said signals at a remote point in combination radio transmitting means on each conductor arranged to transmit a signal individual to a variable thereof by a carrier frequency individual thereto, prime and standby radio receivers for each phase conductor at said remote point simultaneously responsive to the carrier frequency of the respective radio transmitting means, means individual to each prime and standby radio receiver for indicating whether it is receiving the respective carrier frequency and is capable of receiving the same, prime and standby adder means responsive respectively to said prime and standby radio receivers, phase comparator means responsive to said prime and standby receivers for each phase, prime and standby level detector means responsive respectively to said prime and standby adder means, phase level detector means responsive respectively to said phase comparator means, and prime and standby AND gates responsive respectively to said prime and standby level detector means and individually responsive to corresponding phase level detector means and have for operation thereby the respective indicating means.

12. In a system for transmitting signals corresponding to a variable of a high voltage conductor and receiving said signals at a remote point, in combination, prime and standby radio transmitters on said conductor arranged to transmit said signals at slightly different carrier frequencies and slightly different field strength levels, a radio receiver at said remote point responsive to a mixture of said signals for generating a frequency variation component derived from mixing of the carrier signals, which is proportional in magnitude to the frequency difference of the carrier signals, and an amplitude variation component derived from mixing of the carrier signals, which is proportional in magnitude to the ratio of the field strengths of the carrier signals, said frequency variation component lying within the bandpass characteristics of the RF and IF component's of the receiver, first circuit means in said radio receiver responsive to the signals corresponding to said variable at either frequency and either field strength level for controlling the operation of a device in accordance with said variable, second circuit means in said radio receiver responsive to said frequency variation component, means operated by said second circuit means for indicating whether said carrier frequencies are being transmitted by said transmitters; and carrier level relay control means in said radio receiver comprising prime carrier level circuit means responsive to a relatively high field strength level from said prime transmitter, a prime control relay that is energized at and above said relatively high field strength level, and a prime transmitter "OFF" signalling device controlled by said prime control relay, standby carrier level circuit means responsive to a relatively low field strength level from said standby transmitter, a standby control relay that is energized at and above said relatively low field strength level, and a standby transmitter "OFF" signalling device controlled by said standby control relay.

13. In a system for transmitting signals corresponding to a variable of high voltage conductor and receiving said signals at a remote point, in combination, prime and standby radio transmitters on said conductor arranged to transmit said signals at slightly different carrier frequencies and slightly different field strength levels, a radio receiver at said remote point responsive to a mixture of said signals for generating a frequency variation component derived from mixing of the carrier signals, which is proportional in magnitude to the frequency difference of the carrier signals, and an amplitude variation component derived from mixing of the carrier signals, which is proportional in magnitude to the ratio of the field strengths of the carrier signals, said frequency variation component lying within the bandpass characteristics of the RF and IF component's of the receiver, first circuit means in said radio receiver responsive to the signals corresponding to said variable at either frequency and either field strength level for controlling the operation of a device in accordance with said variable, second circuit means in said radio receiver responsive to said frequency variation component, means operated by said second circuit means for indicating whether said carrier frequencies are being transmitted by said transmitters, said first circuit means including relatively low pass filter means to prevent the difference frequency between said carrier frequencies from affecting the operation of said device, said second circuit means including band pass filter means to prevent the modulation signal frequencies outside its pass band from affecting the operation of said indicating means, and de-emphasis network means connected in said second circuit means in advance of said band pass filter means to render operation of said second circuit means independent of amplitude variations due to said carrier frequency difference.

14. In a system for transmitting signals corresponding to a variable of high voltage conductor and receiving said signals at a remote point, in combination, prime and standby radio transmitters on said conductor arranged to transmit said signals at slightly different carrier frequencies and slightly different field strength levels, a radio receiver at said remote point responsive to a mixture of said signals for generating a frequency variation component derived from mixing of the carrier signals, which is proportional in magnitude to the frequency difference of the carrier signals, and an amplitude variation component derived from mixing of the carrier signals, which is proportional in magnitude to the ratio of the field strengths of the carrier signals, said frequency variation component lying within the bandpass characteristics of the RF and IF component's of the receiver, first circuit means in said radio receiver responsive to the signals corresponding to said variable at either frequency and either field strength level for controlling the operation of a device in accordance with said variable, second circuit means in said radio receiver responsive to said amplitude variation component, means operated by said second circuit means for indicating whether said carrier frequencies are being transmitted; and carrier level relay control means in said radio receiver comprising prime carrier level circuit means responsive to a relatively high field strength level from said prime transmitter, a prime control relay that is energized at and above said relatively high field strength level, and a prime transmitter "OFF" signalling device controlled by said prime control relay, standby carrier level circuit means responsive to a relatively low field strength level from said standby transmitter, a standby control relay that is energized at and above said relatively low field strength level, and a standby transmitter "OFF" signalling device controlled by said standby control relay.

15. In a system for transmitting signals corresponding to a variable of polyphase conductors of a high voltage alternating current electric power transmission line and receiving said signals at a remote point, in combination, radio transmitting means on each conductor arranged to transmit a signal individual to a variable thereof by a carrier frequency individual thereto, prime and standby radio receivers for each phase conductor at said remote point simultaneously responsive to the carrier frequency of the respective radio transmitting means, means individual to each prime and standby radio receiver for indicating whether it is receiving the respective carrier frequency and is capable of receiving the same, said radio transmitting means comprising prime and standby radio transmitters on each conductor arranged to transmit said signals at different frequencies of the order of 0.010 percent, and different field strength levels on the order of a ratio of 0.5 and the corresponding prime and standby radio receivers each being responsive to said different frequencies and field strength levels.

* * * * *